United States Patent
Ramaiah Nanjundaiah et al.

(10) Patent No.: US 9,773,214 B2
(45) Date of Patent: Sep. 26, 2017

(54) CONTENT FEED PRINTING

(75) Inventors: Vishwanath Ramaiah Nanjundaiah, Bangalore (IN); Venugopal Kumarahalli Srinivasmurthy, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 456 days.

(21) Appl. No.: 13/567,690

(22) Filed: Aug. 6, 2012

(65) Prior Publication Data
US 2014/0036303 A1 Feb. 6, 2014

(51) Int. Cl.
| G06F 3/12 | (2006.01) |
| G06Q 10/00 | (2012.01) |
| H04L 29/08 | (2006.01) |
| G06Q 30/02 | (2012.01) |
| G06F 17/30 | (2006.01) |
| G06Q 10/06 | (2012.01) |
| G06F 15/00 | (2006.01) |

(52) U.S. Cl.
CPC .......... *G06Q 10/00* (2013.01); *G06F 3/1204* (2013.01); *G06F 3/1247* (2013.01); *G06F 3/1269* (2013.01); *G06F 3/1288* (2013.01); *G06F 17/3089* (2013.01); *G06Q 10/06* (2013.01); *G06Q 30/02* (2013.01); *H04L 67/26* (2013.01)

(58) Field of Classification Search
CPC .... H06F 3/1204; G06F 3/1274; G06F 3/1287; G06F 3/1265; G06F 3/1288; H04N 1/00244; H04N 1/00278; H04N 1/32502; H04N 1/32771; H04N 2201/0039

USPC .... 358/1.1, 1.9, 1.11, 1.12, 1.13, 1.14, 1.15, 358/1.16, 1.17, 1.18
See application file for complete search history.

(56) References Cited

U.S. PATENT DOCUMENTS

| 6,975,419 B2 | 12/2005 | Staas et al. |
| 7,065,497 B1 | 6/2006 | Brewster et al. |
| 7,225,401 B2 | 5/2007 | Purvis |
| 7,249,319 B1 | 7/2007 | Payne et al. |
| 7,290,285 B2 | 10/2007 | McCurdy et al. |
| 7,302,423 B2 | 11/2007 | De Bellis |
| 7,386,791 B2 | 6/2008 | Jacobson |
| 7,565,350 B2 | 7/2009 | Fetterly et al. |

(Continued)

FOREIGN PATENT DOCUMENTS

| CN | 101329687 A | 12/2008 |
| CN | 102073728 A | 5/2011 |

(Continued)

OTHER PUBLICATIONS

Merrill, Read any RSS feed on our Lexmark All-in-one-Printer, Techcrunch, Jul. 6, 2010, 2 pages.

(Continued)

*Primary Examiner* — Thierry L Pham
(74) *Attorney, Agent, or Firm* — HP Inc. Patent Department

(57) ABSTRACT

A user requests a plurality of content feeds. Content associated with the content feeds is periodically retrieved and converted to a print format. Contents associated with the content feeds are stored in the print format. Indications corresponding to the content feeds are provided to a network connected printer and displayed on a user interface thereof, including an indication that new content is available in the print format.

14 Claims, 3 Drawing Sheets

(56) References Cited

U.S. PATENT DOCUMENTS

| | | |
|---|---|---|
| 7,617,446 B2 | 11/2009 | Dutta |
| 7,711,747 B2 | 5/2010 | Renders et al. |
| 7,720,835 B2 | 5/2010 | Ward et al. |
| 7,769,751 B1 | 8/2010 | Wu et al. |
| 7,861,165 B2 | 12/2010 | Stevenson |
| 7,996,000 B1 | 8/2011 | Dubinko et al. |
| 8,020,090 B2 | 9/2011 | Chen et al. |
| 8,046,681 B2 | 10/2011 | Vydiswaran et al. |
| 8,479,092 B1 | 7/2013 | Pandey |
| 8,593,666 B2 | 11/2013 | Xiao |
| 8,645,369 B2 | 2/2014 | Poblete et al. |
| 8,683,379 B2 | 3/2014 | LuVogt et al. |
| 8,713,438 B1 | 4/2014 | Broniek et al. |
| 8,745,091 B2 | 6/2014 | McHenry et al. |
| 2002/0078045 A1 | 6/2002 | Dutta |
| 2002/0123988 A1 | 9/2002 | Dean et al. |
| 2003/0142801 A1 | 7/2003 | Pecht |
| 2003/0210424 A1 | 11/2003 | Sandfort et al. |
| 2004/0185882 A1 | 9/2004 | Gecht et al. |
| 2004/0249934 A1 | 12/2004 | Anderson et al. |
| 2004/0252332 A1 | 12/2004 | McCoog et al. |
| 2005/0120311 A1 | 6/2005 | Thrall |
| 2005/0138065 A1 | 6/2005 | Ciriza |
| 2005/0154718 A1 | 7/2005 | Payne et al. |
| 2006/0033950 A1* | 2/2006 | Nakamura ............ 358/1.15 |
| 2006/0048053 A1 | 3/2006 | Sembower et al. |
| 2006/0123114 A1 | 6/2006 | Aoki et al. |
| 2006/0125820 A1 | 6/2006 | Turcan et al. |
| 2006/0143286 A1 | 6/2006 | Aoki et al. |
| 2006/0167862 A1 | 7/2006 | Reisman |
| 2006/0173985 A1 | 8/2006 | Moore |
| 2006/0277482 A1 | 12/2006 | Hoffman et al. |
| 2007/0027932 A1 | 2/2007 | Thibeault |
| 2007/0047844 A1 | 3/2007 | Watanabe et al. |
| 2007/0130509 A1 | 6/2007 | Gombert et al. |
| 2007/0174298 A1* | 7/2007 | Tanimoto ............ 707/10 |
| 2007/0220411 A1 | 9/2007 | Hauser |
| 2007/0247664 A1* | 10/2007 | Yamamoto ............ 358/1.16 |
| 2008/0005250 A1 | 1/2008 | Oksum |
| 2008/0005651 A1 | 1/2008 | Grefenstette et al. |
| 2008/0030775 A1 | 2/2008 | Adachi et al. |
| 2008/0046459 A1* | 2/2008 | Hinohara ............ 707/102 |
| 2008/0068650 A1* | 3/2008 | Negoro ............ 358/1.15 |
| 2008/0089709 A1* | 4/2008 | Higashi ............ 399/79 |
| 2008/0097828 A1 | 4/2008 | Silverbrook et al. |
| 2008/0147514 A1 | 6/2008 | Shuster et al. |
| 2008/0307308 A1 | 12/2008 | Sullivan et al. |
| 2009/0002770 A1 | 1/2009 | Cavill et al. |
| 2009/0013071 A1* | 1/2009 | Matoba et al. ............ 709/224 |
| 2009/0030889 A1 | 1/2009 | Chatow et al. |
| 2009/0119260 A1 | 5/2009 | Chopra et al. |
| 2009/0171751 A1 | 7/2009 | Zhou et al. |
| 2009/0310168 A1 | 12/2009 | Kunioka et al. |
| 2009/0316198 A1* | 12/2009 | Takeuchi et al. ............ 358/1.15 |
| 2010/0069116 A1 | 3/2010 | Silverbrook et al. |
| 2010/0145955 A1 | 6/2010 | McDonald et al. |
| 2010/0281351 A1 | 11/2010 | Mohammed |
| 2010/0328725 A1 | 12/2010 | Gaucas et al. |
| 2011/0040823 A1 | 2/2011 | Liu et al. |
| 2011/0078558 A1 | 3/2011 | Bao et al. |
| 2011/0213894 A1 | 9/2011 | Silberstein et al. |
| 2011/0235088 A1 | 9/2011 | Luo |
| 2012/0062935 A1 | 3/2012 | Kamath et al. |
| 2012/0212772 A1 | 8/2012 | Hwang et al. |
| 2012/0262754 A1 | 10/2012 | Hwang |
| 2013/0010333 A1 | 1/2013 | Anand et al. |
| 2013/0103461 A1 | 4/2013 | Bhatia |
| 2013/0185364 A1 | 7/2013 | Bhatia |
| 2013/0222843 A1 | 8/2013 | Ganesan et al. |
| 2014/0057238 A1 | 2/2014 | Okamoto et al. |
| 2014/0122486 A1 | 5/2014 | Simard et al. |
| 2014/0214632 A1 | 7/2014 | Garera et al. |

FOREIGN PATENT DOCUMENTS

| | | |
|---|---|---|
| CN | 102253937 A | 11/2011 |
| WO | WO-2013048428 A1 | 4/2013 |

OTHER PUBLICATIONS

"Printable Web Pages on the Fly!" (Web Page) retrieved on Oct. 30, 2013 at http://www.printer-friendly.com/2008011945/java/web2printer.html.

SPCURTIS81, "App Idea—Select Your Own RSS Feed for Scheduled Printing," HP Support Forums, Jul. 26, 2012, <http://h30434.www3.hp.com/t5/ePrint-Print-Apps-Mobile-Printing-and-ePrintCenter/App-Idea-Select-Your-Own-RSS-Feed-For-Scheduled-Printing/td-p/1700391>.

Wikipedia, "Delicious (website)," Jun. 4, 2012, <http://web.archive.org/web/20120604165352/https://en.wikipedia.org/wiki/Delicious_(website)>.

Wikipedia, "Google bookmarks," Mar. 7, 2012, <http://web.archive.org/web/20120307041604/http://en.wikipedia.org/wiki/Google_Bookmarks>.

Luo, P. et al., "Web Article Extraction for Web Printing: a DOM+Visual based Approach," Hewlett-Packard Company, 9th ACM Symposium on Document Engineering, Aug. 2009, p. 1-5.

Chen, Y. et al., "Improve on Frequent Access Path Algorithm in Web Page Personalized Recommendation Model," (Research Paper), 2011 International Conference on Information Science and Technology (ICIST), Mar. 2011, 4 pages, found at http://ieeexplore.ieee.org/stamp/starnp.jsp?arnumber=5765216.

International Search Report & Written Opinion received in PCT Application No. PCT/CN2012/000569, Feb. 7, 2013, 6 pages.

Tsukada, M. et al., "Automatic Web-Page Classification by Using Machine Learning Methods," Web Intelligence: Research and Development, Springer Berlin Heidelberg, 2001, pp. 303-313, available at http://www.ar.sanken.osaka-u.ac.jp/papers/2006-12/wi01_tsukada.pdf.

Wikipedia, "Machine learning," Oct. 24, 2014, <http://en.wikipedia.org/wiki/Machine_learning>.

Yu, B. et al., "Video Summarization Based on User Log Enhanced Link Analysis," (Research Paper), 11th ACM International Conference on Multimedia, 2003, 2 pages, found at http://d1.acm.org/citation.cfm?id=957013.957095&coll=DL&dl=GUIDE&CFID=89676494&CFTOKEN=29375123.

* cited by examiner

CONTENT FEED PRINTING

BACKGROUND

Much online content is made available through web sites or web syndication feeds. RSS ("Really Simple Syndication") and Atom are popular web feed formats used to publish frequently updated works in a standardized format. A typical content feed document includes full or summarized text, plus metadata such as publishing dates, authorship, etc. Internet users can subscribe to desired contents through these feeds. Additionally, internet users often use online bookmarking services to keep a reference to their favorite contents on the web.

DETAILED DESCRIPTION

Figure 1:
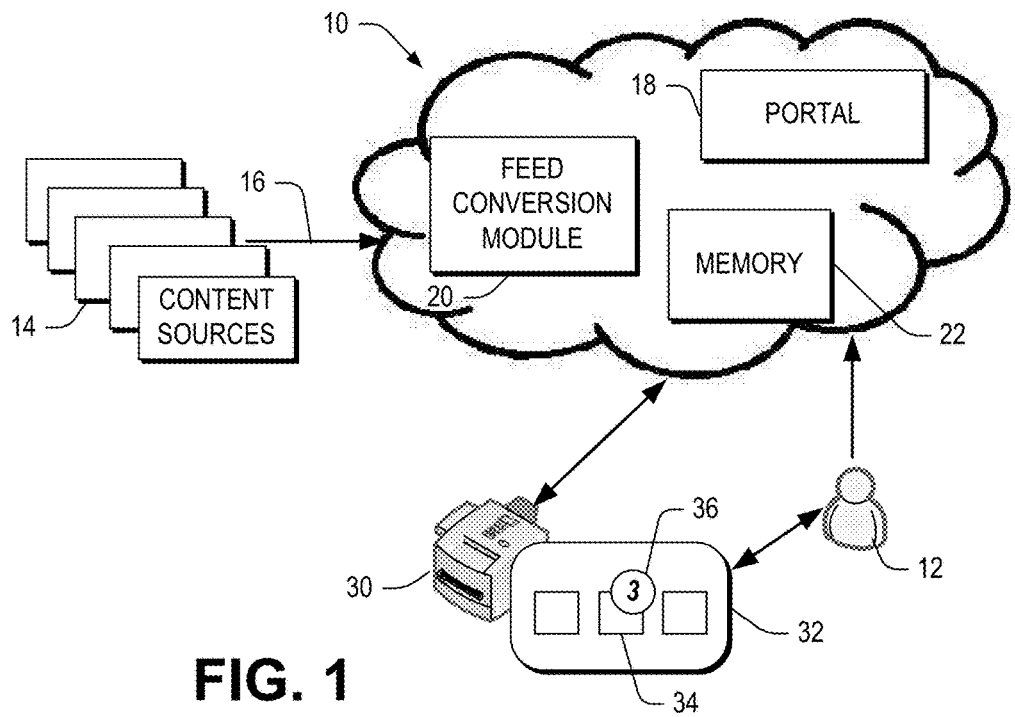
FIG. 1 is a block diagram conceptually illustrating aspects of an example cloud printing system including a content feed conversion module in accordance with the present disclosure.

In the following detailed description, reference is made to the accompanying drawings which form a part hereof, and in which is shown by way of illustration specific examples. It is to be understood that other implementations may be utilized and structural or logical changes may be made without departing from the scope of the present invention. The following detailed description, therefore, is not to be taken in a limiting sense, and the scope of the present invention is defined by the appended claims. It is to be understood that features of the various embodiments described herein may be combined with each other, unless specifically noted otherwise.

RSS ("Really Simple Syndication") and Atom are popular web feed formats used to publish frequently updated works in a standardized format. Online bookmarking services such as Google Bookmarks and Delicious allow users to save favorite websites. However, these feeds and bookmarks are normally accessed either through a browser or a content feed application such as an RSS/Atom reader or aggregator. This can result in limitations for users who desire to print this content. Further, the user typically has to first view the content on a browser or suitable feed client application in order to print such RSS feed or web content.

The present disclosure provides systems and methods wherein requests are received from a user for a plurality of content feeds, and content associated with the content feeds is periodically retrieved converted to a print format. The contents associated with the content feeds in the print format are stored in a memory for printing. Indications corresponding to the content feeds are displayed on the user interface of a web connected printer so that a user can select the indications to print the contents associated with the content feeds in the print format.

An internet application, commonly referred to as an application or simply an "app," is designed to allow a user to perform a singular or multiple related specific tasks, often leveraging Internet connectivity. Such apps are designed for a variety of web-connected devices, including mobile devices, desktop computers, notebooks, printers, and the like. As used herein, applications that connect users to content associated with respective content feeds are referred to as content connection apps or applications. As used herein, a content feed refers to a web feed from a content provider. These feeds typically contain frequently updated content. While delivery formats and protocols may vary, web feeds are typically delivered as XML (eXtensible Markup Language).

Apps are often individually programmed (e.g., using Java, .NET, Python, etc.) to satisfy API (application Programming Interface) requirements of a service provider or a service provider platform. For example, a service provider may provide a set of services such as authentication, security, display control, etc. via one or more APIs. Thus, in developing applications for compatibility with the service provider platform, computer programmers write code that adheres to the rules and specifications of the various applicable APIs. While certain parts of programming code may be leveraged from one application to another, each application supported by a service provider platform typically has unique standalone programming code for running the application.

FIG. 1 illustrates an example system that, among other things, consolidates content generated from information sources such as content feeds and web favorites, converts the content to a print format, and provides a point of access for printing the content from a printer user interface. In certain implementations, the system 10 provides an app that can host multiple feed-based apps. FIG. 1 and certain of the subsequent drawing figures disclosed herein include particular components, modules, etc. to conceptually illustrate various implementations, though more, fewer, and/or other components, modules, arrangements of components/modules, etc. may actually be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these. Various modules and/or components may be implemented as a non-transitory computer-readable storage medium containing instructions executed by a processor for performing the operations and functions discussed herein.

In the examples illustrated, the modules and components may be integrated into a single physical computing device or they may be physically distributed among multiple computing devices connected, for example, over a network. In some implementations, the system 10 is a cloud service. Cloud computing generally refers to the delivery of computing and storage capacity as a service to end users. The modules and components may be implemented using Javascript or other suitable scripting language capable of executing on a web browser or application runtime environment (e.g., Adobe Flash, AIR, etc.) of any device, or alternatively as a stand-alone program (e.g., Java, .NET, Python, etc.).

In the example illustrated in FIG. 1, a user 12 can view various content sources 14 and request content feeds 16, such as RSS/Atom feeds associated with the content sources 14, which are received by a web portal 18 in the form of subscriptions. Alternatively, the subscriptions could be bookmarked web sites corresponding to the content sources 14. The web portal 18, for example, could receive the content feeds 16 via a browser plug-in, or by the user 12 adding the feed link directly on the web portal 18.

Contents associated with the content feeds 16 are periodically retrieved by an app that is implemented by a processor 20. The processor is a component of a cloud connected computer system in some examples. The app executed by the processor 20 aggregates the contents associated with the web feeds 16 and converts the retrieved contents to a print format. The contents associated with the content feeds in the print format are stored in a memory 22. A network connected printer 30 has a user interface 32, upon which indications 34 corresponding to the content feeds 16, such as article headers are displayed. The user 12 can then select a desired indication 34 and in response to the user's selection, the contents associated with the selected feed 16 in the print format are sent from the memory 22 to the printer 30 for printing. Thus, the user interface 32 can provide the user 12 a consolidated, grouped list of content available for printing.

In some implementations, the system functions as a Meta-app that can host multiple feed-based apps. The user's 12 requests for content feeds, or subscriptions, can be organized into categories, and each category of subscriptions appears as an app 34 for the user 12 on the user interface 32 of the printer 30. Content associated with the content feeds is periodically fetched, and article headers are displayed as the indicators for viewing on the user interface 32 in some instances. Thus, when the user 12 opens the app on the printer 30, a grouped list of the articles available for printing is displayed. The user 12 can access and manage subscriptions directly on the web portal 18 in some embodiments.

For example, when feed content is fetched, the associated metadata can be examined and new content identified. Indications 36 can then be provided on the user interface 32 advising the user 12 that new content is available for printing. In the implementation illustrated in FIG. 1, the user interface 32 includes an indication 36 showing that three new articles associated with the content feed app 34 are available for printing. In some implementations, the user 12 can either print content directly via interacting with the printer user interface 32, or the user 12 can schedule prints as desired. The user 12 can opt to have content print as it becomes available, print on a predetermined schedule, or print on demand.

Figure 2:
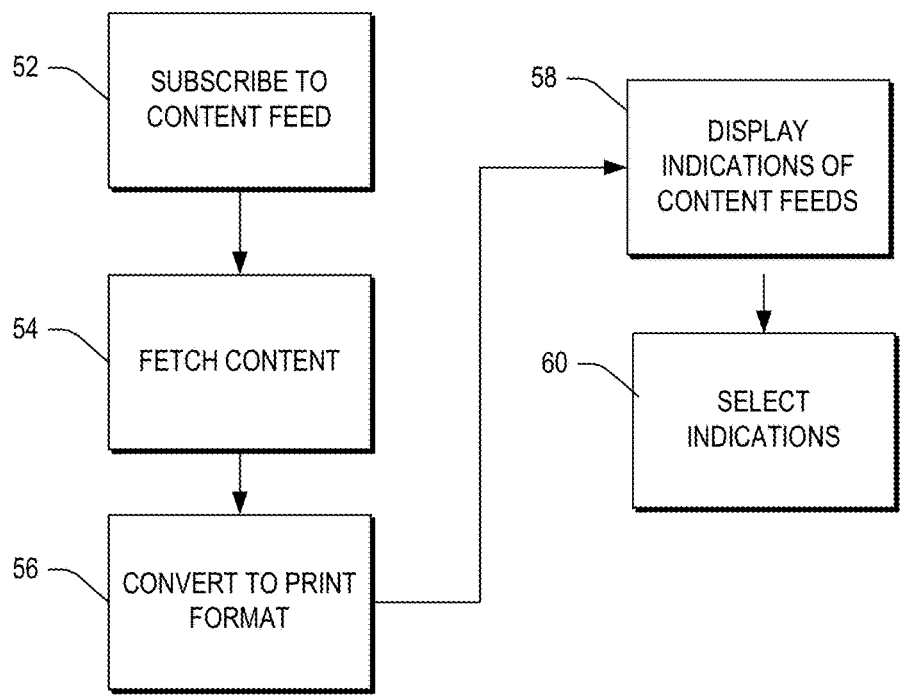
FIG. 2 is a block diagram illustrating an example of a method in accordance with the present disclosure.

FIG. 2 is a flow chart illustrating an example of a disclosed method. Software code embodying the process illustrated in FIG. 2 could be stored in the memory 22, or in other memory devices accessible by the system 10. The user 12 views a news site, a blog, an online photo sharing site, social networking site, etc. that provides a content feed such as an RSS/Atom feed, for example. In block 52, the user 12 requests the content feed by subscribing to the feed. In some implementations, the user 12 does this through a browser plug-in, and the plug-in gets a requested RSS feed link and adds the subscription on the portal 18 for the given user 12. Alternatively, in block 52, the user 12 can copy an RSS link available on the desired website and add it to the user's subscription on the portal 18. Subscriptions can be viewed and modified via the portal 18.

The app periodically fetches the subscribed content in block 54, and in block 56 the content is converted to the print format and cached for printing. Indications of new contents 36 are displayed on the printer user interface 32 in block 58. In block 60, the user 12 selects the indications 34 to print the desired content in the print format. In some embodiments, this includes viewing information about the content provided in the feed metadata such as article titles, previews, etc.

In alternative implementations, the user 12 can bookmark a web site using an online bookmarking service. Credentials for the bookmarking site where the bookmarks are stored can be provided by the user 12 on the portal 18, which then obtains the list of bookmarks (titles) and displays indications 34 of the bookmarked content on the printer user interface 32.

In some implementations, the app that converts the feed contents to a print format is generic application generation engine that leverages hierarchical patterns in content browsing to dynamically instantiate print applications from the content feeds. In particular, it has been observed that many content providers have content repositories having a folder-like organization. For example, Disney content might be organized around favorite characters while Sudoku content might be organized around difficulty. In these and other cases, the content provider expects the user to navigate a hierarchical structure to reach consumable content (e.g., printable content, content for display, interaction, etc.). Embodiments described herein exploit this hierarchical structure using a semantic language (e.g., XML or other suitable format) description to declare the content tree. The semantic language description is incorporated into a predefined declarative data structure engine or semantic language processor that accepts a content feed link (e.g., in the form of a URL or Uniform Resource Locator) as an input argument. Given an indication of the content feed 16, the engine dynamically instantiates a print job specific to the content feed 16 based on metadata for the content feed.

Figure 3:
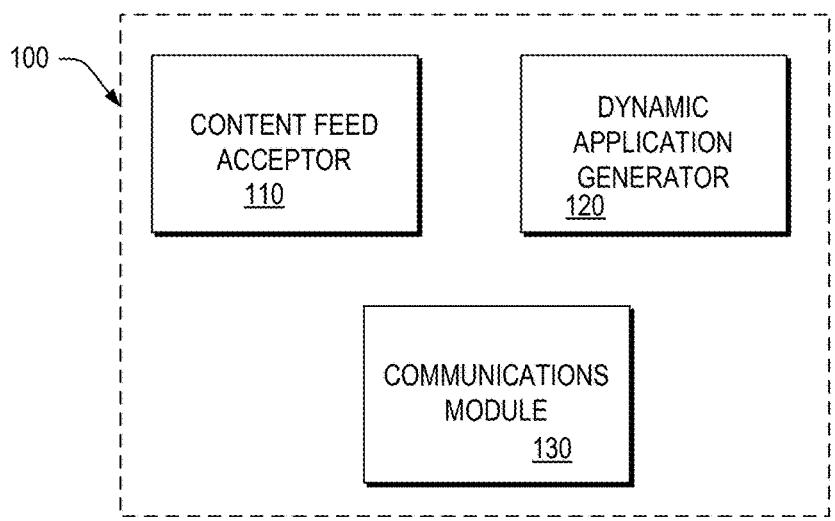
FIG. 3 is a block diagram conceptually illustrating aspects of another example system in accordance with the present disclosure.

FIG. 3 is a block diagram illustrating an example of an application generation engine 100. As shown by the dotted line, the components, modules, etc. of the engine 100 may be incorporated into a single physical device or they may be distributed across multiple physical devices, for example, over a network. A content feed acceptor 110 receives an indication (e.g., a feed link or URL or both) of content feeds 16 from different content providers over a network such as the internet. Content associated with each content feed 16 is structured as a hierarchy tree, where each intermediate node reflects a category of content—similar to a folder—and each leaf node represents consumable (e.g., printable, displayable, etc.) content.

A dynamic application generator 120 instantiates a unique executable application for each content feed 16 based on its respective feed link. In the illustrated system, the unique executable application is a print job. For example, the feed link may contain or point to metadata and/or content configuration source information in semantic format (e.g., XML or other suitable format) for the hierarchical content in the content feed 16. It should be noted that content feed indications may be recursive. In other words, a feed link may reference one or more nested feed links.

Figure 4:
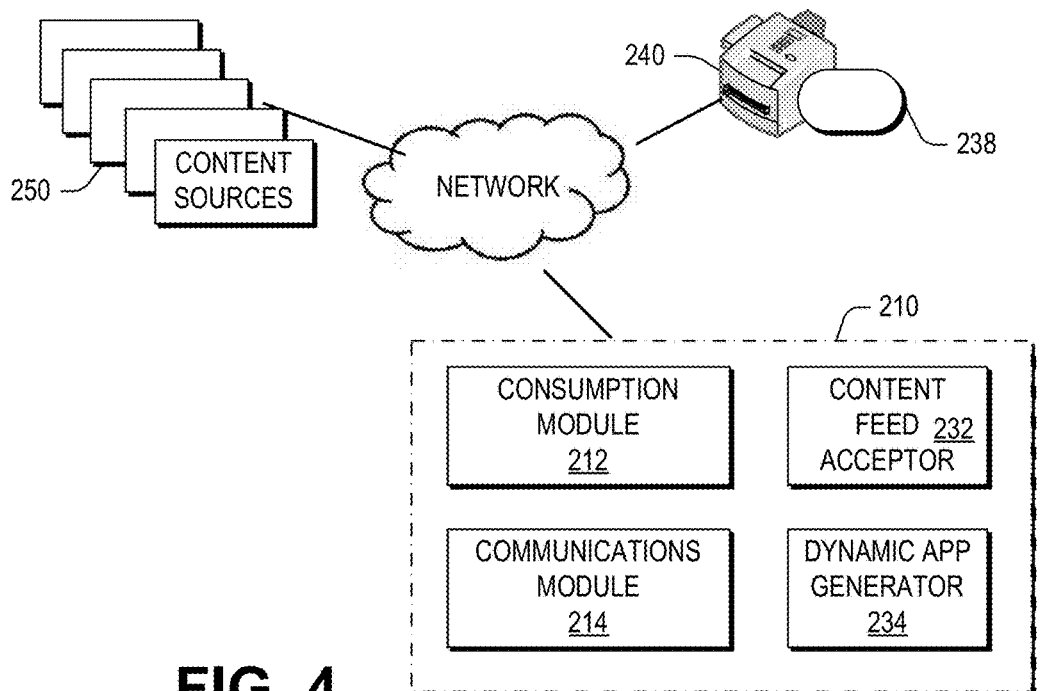
FIG. 4 is a block diagram conceptually illustrating aspects of another example system in accordance with the present disclosure.

FIG. 4 is a block diagram illustrating another example system. In the example illustrated in FIG. 4, the modules and components of system 210 may be integrated into a single physical computing device or they may be physically distributed among multiple computing devices connected, for example, over a network. In particular, the content feed acceptor 232 and the dynamic application generator 234 may be implemented by a cloud-connected computer system running content connection applications. The content feed acceptor 232 receives an indication (e.g., a feed link or URL) of hierarchical content feeds (e.g., content feeds 250) from different content providers over a network. The feed link may contain (or point to) metadata and/or content configuration source information in semantic format (e.g., XML or other suitable format) for the hierarchical content associated with the content feed. Content for the content feed tree hierarchy is structured such that each intermediate node reflects a category of content and each leaf node represents printable content. Accordingly, the dynamic application generator 234 instantiates a unique print job for each content feed based on its respective feed link and/or other metadata for the content feed.

Once a content connection application for a content feed has been instantiated, the dynamic application generator 234 provides the root node of the content tree to the user interface 238 of the printer 240 or other computing device. User selection of the root node initiates execution of the application. User selection of a root node for an application via the user interface 238 allows the user to interact with the hierarchical content tree associated with the respective content feed. Each intermediate node of the content tree reflects a category of content and each leaf node represents consumable content and/or an action such as printing, previewing, etc.

Figure 5:
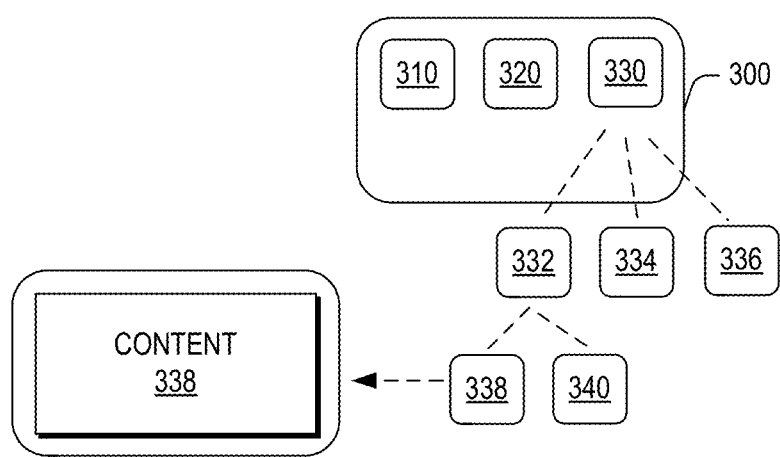
FIG. 5 is a block diagram conceptually illustrating aspects of an example user interface in accordance with the present disclosure.

FIG. 5 illustrates an example of a user interface 300 for interacting with hierarchical content for applications generated by a dynamic application generator (e.g., 120, 234, etc.). In this example, the user interface 300 is a touch user interface; however, any suitable UI could be used in the alternative. As shown, the user interface 300 contains three end-user applications 310, 320, 330, each representing a root node of a content tree for a given content feed. When the user selects, for example, the "sports" application 330, intermediate nodes 332, 334, and 336 are presented to the user. By selecting the "basketball" node 332, the user is further presented with content nodes 338 and 340. In various embodiments, selecting content node 338 causes the user interface 300 to display the content associated with the content node 338 (e.g., an image of a basketball player). In other implementations, selecting the content node 338 may generate a request for action to be taken on the content associated with content node 338. For example, selecting content node 338 may cause a print request to be generated for the content.

While nodes of a content tree may be presented as selectable indications as shown in FIG. 5, other forms of displaying content nodes could also be used. For example, if the user interface 300 is a touch screen interface, nodes at each level of the content tree might be displayed one at a time on the user interface 300, perhaps consuming the full display. Switching between nodes on the same hierarchy level might be accomplished by a swiping gesture or other touch-related gesture. A selection gesture (e.g., tapping on a touch screen) then moves the user to a different level of the content tree. Other suitable interaction schemes for interacting with the content tree via a user interface could also be used.

In various implementations, the communications module 214 receives an indication of a user traversing a content tree for an application to reach a leaf node. In response, a consumption module 212 obtains the content for the leaf node (e.g., by accessing a URL for the leaf node content) and renders the content into a print-ready format. Once the content is rendered, it is cached for printing and the communications module 214 provides the rendered content over a network to a printer associated with the user.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system, comprising:
   a portal configured to receive requests from a user for a plurality of content feeds;
   a feed conversion module configured to periodically retrieve content associated with the content feeds, the feed conversion module configured to convert the retrieved content to print format;
   a memory accessible by the feed conversion module configured to store the converted content in print format; and
   wherein the feed conversion module is further configured to provide indications corresponding to the content feeds to a network connected printer having a user interface, the indications including an indication to be displayed at the user interface that new content comprising the converted content in print format is available for printing,
   wherein the network connected printer is configured to print converted content according to a predetermined schedule, where a printing schedule differs from a schedule for retrieving content; and
   wherein a content feed has hierarchical content with at least three levels, and wherein the system further comprises an application generation engine configured to:
   dynamically instantiate a content connection application via an instance of a pre-defined declarative data structure engine that incorporates the content feed; and
   traverse the hierarchy of content to generate a print job.

2. A method, comprising:
   receiving requests from a user for a plurality of content feeds;
   periodically retrieving, by an application generation engine, content associated with the content feeds;
   converting, by the application generation engine, the retrieved contents to a print format;
   storing the converted content in the print format in a memory; and
   printing the converted content as the converted content becomes available,
   wherein a content feed has content structured as a hierarchy tree having intermediate nodes that each represent a category of content and leaf nodes that each represent printable content.

3. The method of claim 2, wherein the content feeds include an RSS feed.

4. The method of claim 2, wherein the content feeds include bookmarked web sites.

5. The method of claim 2, wherein a content feed has hierarchical content with at least three levels, and wherein the method further comprises:
   dynamically instantiating a content connection application via an instance of a pre-defined declarative data structure engine that incorporates the content feed; and
   traversing the hierarchy of content to generate a print job.

6. A non-transitory computer-readable storage medium containing instructions that when executed by a processor perform a method, comprising:
 receiving requests from a user for a plurality of content feeds;
 periodically retrieving content associated with the content feeds;
 consolidating the retrieved content from the plurality of content feeds based on metadata;
 converting the consolidated content to a print format by a processor;
 storing the converted content in the print format in a network connected memory:
 displaying indications corresponding to the converted content on a printer user interface, the indications including an indication that new content comprising the converted content in the print format is ready for printing; and
 printing the converted content.

7. The on-transitory computer-readable storage medium of claim 6, wherein the method further comprises:
 receiving requests from the user for a plurality of bookmarked web sites.

8. The non-transitory computer-readable storage medium of claim 6, wherein printing the converted content includes printing according to a predetermined schedule.

9. The non-transitory computer-readable storage medium of claim 6, wherein printing the converted content includes printing the converted content as the converted content becomes available.

10. The non-transitory computer-readable storage medium of claim 6, wherein a content feed has hierarchical content with at least three levels, and wherein the method further comprises:
 dynamically instantiating a content connection application via an instance of a pre-defined declarative data structure engine that incorporates the content feed; and
 traversing the hierarchy of content to generate a print job.

11. The non-transitory computer-readable storage medium of claim 6, wherein a content feed has content structured as a hierarchy tree having intermediate nodes that each represent a category of content, and leaf nodes that each represent printable content.

12. The system of claim 1, wherein a content feed has content structured as a hierarchy tree having intermediate nodes that each represent a category of content, and leaf nodes that each represent printable content.

13. The non-transitory computer-readable storage medium of claim 6, wherein printing of the content feeds may be performed using each of the following modes: in response to selection of the indication by a user via the printer user interface; printing according to a predetermined schedule; and printing as new content becomes available.

14. The system of claim 12, wherein the content is stored in a hierarchical structure, including an intermediate node, reflective of the structure of the content feed.

* * * * *

UNITED STATES PATENT AND TRADEMARK OFFICE
CERTIFICATE OF CORRECTION

PATENT NO. : 9,773,214 B2
APPLICATION NO. : 13/567690
DATED : September 26, 2017
INVENTOR(S) : Vishwanath Ramaiah Nanjundaiah et al.

Page 1 of 1

It is certified that error appears in the above-identified patent and that said Letters Patent is hereby corrected as shown below:

In the Claims

In Column 6, Line 20, in Claim 1, delete "content to" and insert -- content to a --, In Column 7, Line 12 approx., in Claim 6, delete "memory:" and insert -- memory; --, In Column 7, Line 19, in Claim 7, delete "on - transitory" and insert -- non - transitory --.

Signed and Sealed this
Thirteenth Day of March, 2018

Andrei Iancu
*Director of the United States Patent and Trademark Office*